United States Patent
Fox (10) Patent No.: US 11,185,951 B2
(45) Date of Patent: Nov. 30, 2021

(54) METHOD OF MANUFACTURING A CURVED BRACE

(71) Applicant: FOX HARDWOOD LUMBER COMPANY, L.L.C., Franklin, TN (US)

(72) Inventor: Samuel Fox, Franklin, TN (US)

(73) Assignee: FOX HARDWOOD LUMBER COMPANY, L.L.C., Franklin, TN (US)

( * ) Notice: Subject to any disclaimer, the term of this patent is extended or adjusted under 35 U.S.C. 154(b) by 442 days.

(21) Appl. No.: 16/433,656

(22) Filed: Jun. 6, 2019

(65) Prior Publication Data

US 2020/0384582 A1 Dec. 10, 2020

Related U.S. Application Data (63) Continuation-in-part of application No. 16/433,129, filed on Jun. 6, 2019, now Pat. No. 10,745,914.

(51) Int. Cl.
| | |
|---|---|
| *B23K 37/04* | (2006.01) |
| *E04C 3/07* | (2006.01) |
| *B21D 11/20* | (2006.01) |
| *B21D 5/01* | (2006.01) |
| *E04C 3/02* | (2006.01) |

(52) U.S. Cl.
CPC ............... *B23K 37/04* (2013.01); *B21D 5/01* (2013.01); *B21D 11/203* (2013.01); *E04C 3/07* (2013.01); *E04C 2003/026* (2013.01)

(58) Field of Classification Search
CPC ........ B23K 37/04; B21D 11/203; B21D 5/01; B21D 5/00; B21D 11/20; E04C 3/07; E04C 2003/026
See application file for complete search history.

(56) References Cited

U.S. PATENT DOCUMENTS

| | | | |
|---|---|---|---|
| 8,516,752 B2 * | 8/2013 | Macchietto | F21V 21/38 52/123.1 |
| 10,214,938 B2 * | 2/2019 | Pan | E04H 15/58 |
| 10,745,914 B1 * | 8/2020 | Fox | E04C 3/04 |
| D901,281 S * | 11/2020 | Fox | D8/354 |
| 2013/0111848 A1 * | 5/2013 | Macchietto | E04H 12/18 52/831 |
| 2017/0335595 A1 * | 11/2017 | Pan | E04H 15/58 |

FOREIGN PATENT DOCUMENTS

| | | | | |
|---|---|---|---|---|
| CA | 3045581 A1 | * | 12/2020 | ............... E04C 3/04 |
| CN | 112427501 A | * | 3/2021 | |
| CN | 112496098 A | * | 3/2021 | |
| CN | 112536344 A | * | 3/2021 | |

* cited by examiner

*Primary Examiner* — Brent W Herring
(74) *Attorney, Agent, or Firm* — Shane Cortesi (57) ABSTRACT

A curved brace is described herein. In some embodiments, the curved brace includes a base plate that has a proximal segment with one or more fastener apertures that is configured to confront a vertical post, a distal segment located distal to the proximal segment that includes one or more fastener apertures that is configured to confront a lateral beam and a curved middle segment located between the proximal and distal segments. A support plate with a curved base as well as a curved free edge may be attached to the base plate. The curved middle segment of the base plate may have an apex facing the apex angle formed at the connection of the lateral beam to the support beam. Methods of using and manufacturing the curved brace are also described.

19 Claims, 10 Drawing Sheets

METHOD OF MANUFACTURING A CURVED BRACE

BACKGROUND

Technical Field

The present invention relates to building materials, more particularly, braces for supporting a lateral beam.

Background of the Invention

In building, there is a desire to support lateral beams. Often brackets are used to connect support posts to lateral beams. However, there is a continuing need to support lateral beams.

BRIEF SUMMARY

A curved brace and method of making same are disclosed. In some embodiments, the present disclosure provides a method of supporting a lateral beam. The method may include: a) providing a support post that may have a top end, a bottom end and a height extending from the top end to the bottom end; b) providing a lateral beam that may have a proximal end, a distal end and a lateral beam length extending from the proximal end to the distal end, the lateral beam may be connected to and form an apex angle with the support post, the lateral beam proximal end may be adjacent to the support post; c) providing a curved brace that may include a base plate comprising a base plate interior surface, a base plate exterior surface, a base plate thickness extending from the base plate interior surface to the base plate exterior surface, a base plate proximal end, a base plate distal end, a base plate proximal segment configured to confront the support post, a base plate distal segment located distal to the proximal segment and configured to confront the lateral beam, and a base plate middle segment located between the proximal segment and the distal segment, the base plate proximal segment may comprise at least one proximal segment fastener aperture extending through the base plate thickness, the base plate distal segment may comprise at least one distal segment fastener aperture extending through the base plate thickness, at least the exterior surface of the middle segment may be curved and comprise an apex; and e) positioning the curved brace so that at least a portion of the exterior surface of the middle segment faces the apex angle by placing the exterior surface of the proximal segment against the support post, placing at least one fastener through the at least one proximal segment fastener aperture and into the support post, and placing the exterior surface of the distal segment against the lateral beam and placing at least one fastener through the at least one distal segment fastener aperture and into the lateral beam.

Optionally, the base plate proximal segment and the base plate distal segment are generally straight. Optionally, the base plate proximal segment and the base plate distal segment are approximately the same length. Optionally, the base plate middle segment is at least as long as the combined lengths of the base plate proximal and distal segments. Optionally, the base plate has approximately the same width from the base plate proximal segment to the base plate distal segment. Optionally, the exterior surface of the base proximal segment and the exterior surface of the base plate distal segment are generally flat. Optionally, the base plate middle segment is generally in the shape of an arch. Optionally, the base plate middle segment curves along a substantially constant radius. Optionally, the curved brace further comprises a support plate that may be oriented generally perpendicular to, and extending from, the interior surfaces of the proximal segment, the middle segment and the distal segment. Optionally, the support plate comprises a support plate base attached to the base plate proximal, middle and distal segments, and a free edge opposite the support plate base and extending from the support plate proximal end to the support plate distal end. Optionally, the free edge is generally in the shape of an arch. Optionally, the base plate middle segment is generally in the shape of an arch. Optionally, the base plate middle segment curves along a substantially constant radius. Optionally, the support plate further comprises a generally flat front surface and a generally flat rear surface. Optionally, the base plate proximal segment comprises a plurality of proximal segment fastener apertures extending through the base plate thickness, the base plate distal segment comprises a plurality of distal segment apertures and the support plate is located between (i.e., in front of and behind) and does not cover the proximal segment and distal segment fastener apertures. Optionally, the support plate is welded to the interior surfaces of the base proximal segment, middle segment and distal segment. Optionally, a bracket connects the top end of the support post to the proximal end of the lateral beam. Optionally, the support post and lateral beam are comprised of wood. Optionally, after step d) (i.e., at least after step d), the support post and the exterior surface of the proximal segment are angled approximately 90 degrees relative to the ground, and the lateral beam and the exterior surface of the distal segment are positioned approximately parallel to the ground. (It will be appreciated that prior step d), the support post may be angled approximately 90 degrees relative to the ground and the lateral beam may be angled approximately parallel to the ground). Optionally, the curved brace is comprised of metal.

In still further embodiments, the present disclosure provides a method of manufacturing a curved brace. The method may comprise the steps of a) providing a jig that may have a proximal arm comprising a top and a bottom, a distal arm comprising a top and a bottom, the proximal arm and the distal arm sloping towards one another, the proximal arm and the distal arm may slope towards each from the tops to the bottoms of the respective arms, the proximal arm may form an apex angle with the distal arm, each arm may comprise an interior surface facing the other arm and an exterior surface opposite the interior surface; b) providing a base plate that may include a proximal end, a distal end, a length extending from the proximal end to the distal end, an interior surface, a base plate exterior surface located below the interior surface, a thickness extending from the interior surface to the exterior surface and generally perpendicular to the length, a front, a rear, and a width extending from the front to the rear and generally perpendicular to the thickness and the length, the base plate may comprise a proximal segment, a middle segment distal to the proximal segment, and a distal segment distal to the middle segment; c) providing a support plate that may include a proximal end, a distal end, a length extending from the proximal end to the distal end, a base, a top, a height extending from the base to the top and generally perpendicular to the length, a front surface, a rear surface, and a width extending from the front surface to the rear surface and generally perpendicular to the height and the length, the proximal end and the distal end may slope towards each other from the top to the base of the support plate, and at least a portion of the support plate base may be curved; d) positioning the base plate in the jig so that the proximal end of the base plate confronts the interior surface of the proximal arm and the distal end of the base plate confronts the interior surface of the distal arm; e) before or after step d), positioning the support plate on the base plate interior surface so that the support plate is oriented generally perpendicular to the support plate; f) after at least steps a)-d) (and preferably after steps a)-e)), moving the middle segment of the base plate (and preferably the support plate) downwardly towards the apex angle so that the exterior surface of the proximal segment of the base plate confronts the interior surface of the proximal arm and so that the exterior surface of the distal segment of the base plate confronts the interior surface of the distal arm; and g) securing the base of the support plate, the proximal end of the support plate, and the distal end of the support plate to the base plate interior surface.

Optionally, before step f), the proximal end and the distal end of the support plate slope towards each other from the top to the base of the support plate at the same substantially constant angle. Optionally, before step f), the base plate is generally straight and flat. Optionally, in step e), the proximal end of the support plate is generally parallel to the proximal arm and the distal end of the support plate is generally parallel to the distal arm. Optionally, the jig further comprises a proximal leg connected to the proximal arm and extending downwardly from the proximal arm and a distal leg connected to the distal arm and extending downwardly from the distal arm. Optionally, the base plate is comprised of a malleable material and has a thickness of from about 0.125 inches to about 0.375 inches. Optionally, in step b), the base plate is generally rectangular in shape. Optionally, during step f), a portion of the base plate proximal segment and a portion of the base plate distal segment move downwardly but the proximal and distal ends of the base plate do not move downwardly. Optionally. in step d), the base plate comprises a proximal slit and a distal slit located distal to the proximal slit. Optionally, the proximal and distal slits extend at least partially through the thickness of the base plate. Optionally, the proximal and distal slits extend substantially through the thickness of the base plate. Optionally, the proximal and distal slits do not extend across the entire width of the base plate. Optionally, the proximal and distal slits are generally parallel to the base plate width. Optionally, the proximal slit is located at the intersection of the proximal segment and the middle segment and the distal slit is located at the intersection of the distal segment and the middle segment. Optionally, the proximal segment comprises at least one proximal segment fastener aperture extending through the base plate thickness and located proximal to the proximal slit and further wherein the distal segment comprises at least one distal segment fastener aperture extending through the base plate thickness and located distal to the distal slit. Optionally, the base plate and support plate are metal and step g) comprises welding the base of the support plate, the proximal end of the support plate, and the distal end of the support plate to the base plate interior surface. Optionally, in step d) the base plate has a thickness of from about 0.125 inches to about 0.375 inches. Optionally, in step f), the apex angle is approximately 90 degrees.

DETAILED DESCRIPTION

With reference to FIGS. 1-13, the present invention provides a curved brace generally designated by the numeral 10. In the drawings, not all reference numbers are included in each drawing for the sake of clarity. It will be understood that the above drawings are CAD drawings drawn to scale.

As shown in FIGS. 1-13, in some embodiments, the present disclosure provides a method of supporting a lateral beam 20. In some embodiments, the method includes providing a support post 12 having a top end 14, a bottom end 16 and a height 18 extending from the top end 14 to the bottom end 16. The support post 12 may be in an upright/vertical position as shown in FIGS. 1A-1B and FIGS. 12 and 13. The method may also include providing a lateral beam 20 having a proximal end 22, a distal end 24 and a lateral beam length 26 extending from the proximal end 22 to the distal end 24. As shown in FIGS. 1A-1B and FIGS. 12 and 13, the lateral beam 20 may be connected to and form an apex angle 28 (e.g., 90 degrees) with the support post 12. It will be appreciated that lateral beam 20 need not be directly connected to the support post 12. Instead, a bracket 72 may be used, as noted below and as best seen in FIGS. 1A-1B and FIGS. 12 and 13. Thus, the term apex angle 28 is not intended to require a direct attachment between the lateral beam 20 and support post 12. Regardless of whether the lateral beam 20 is directly connected to the support post 12, the lateral beam proximal end 22 is preferably adjacent to the support post 12.

Figures 5, 6:
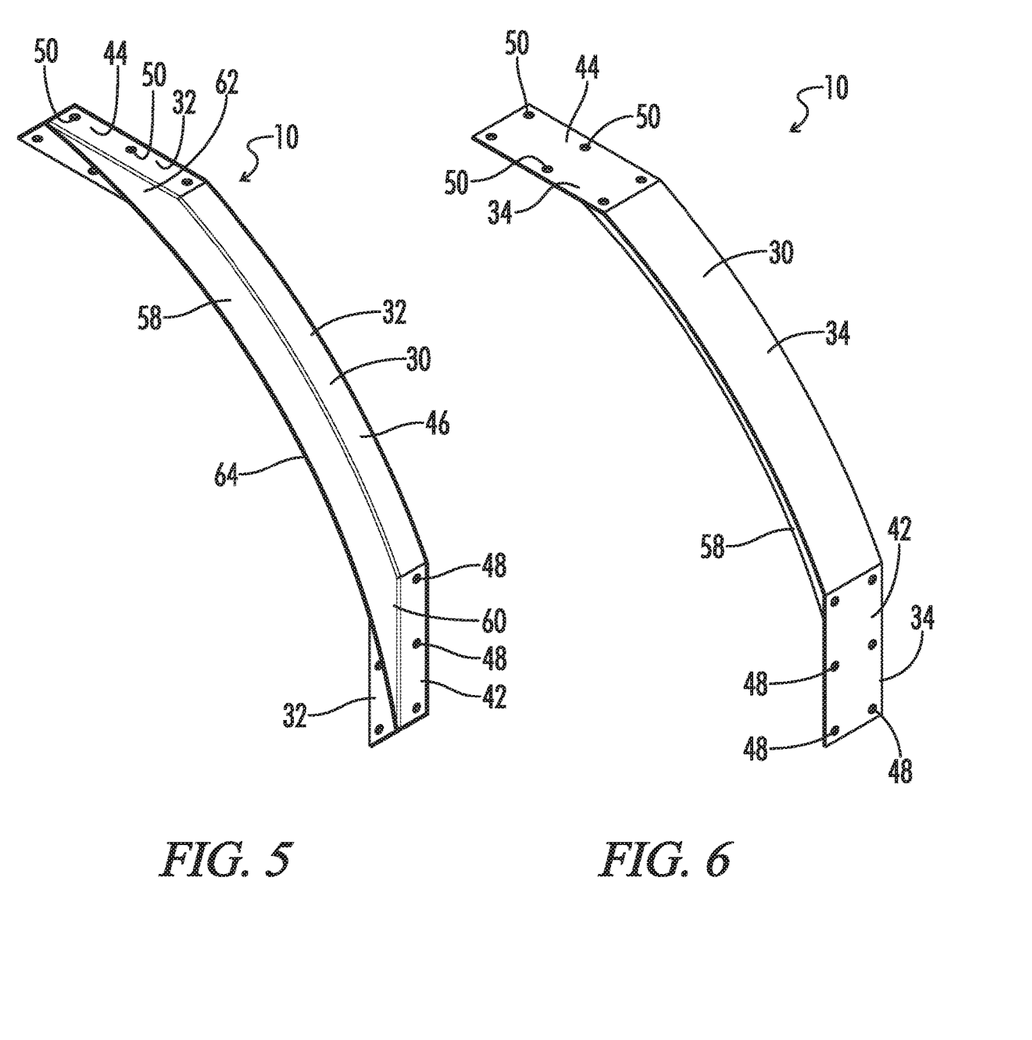
FIG. 5 illustrates a top perspective view of the curved brace of FIG. 1A.
FIG. 6 illustrates a bottom perspective view of the curved brace of FIG. 1A.
Figure 12:
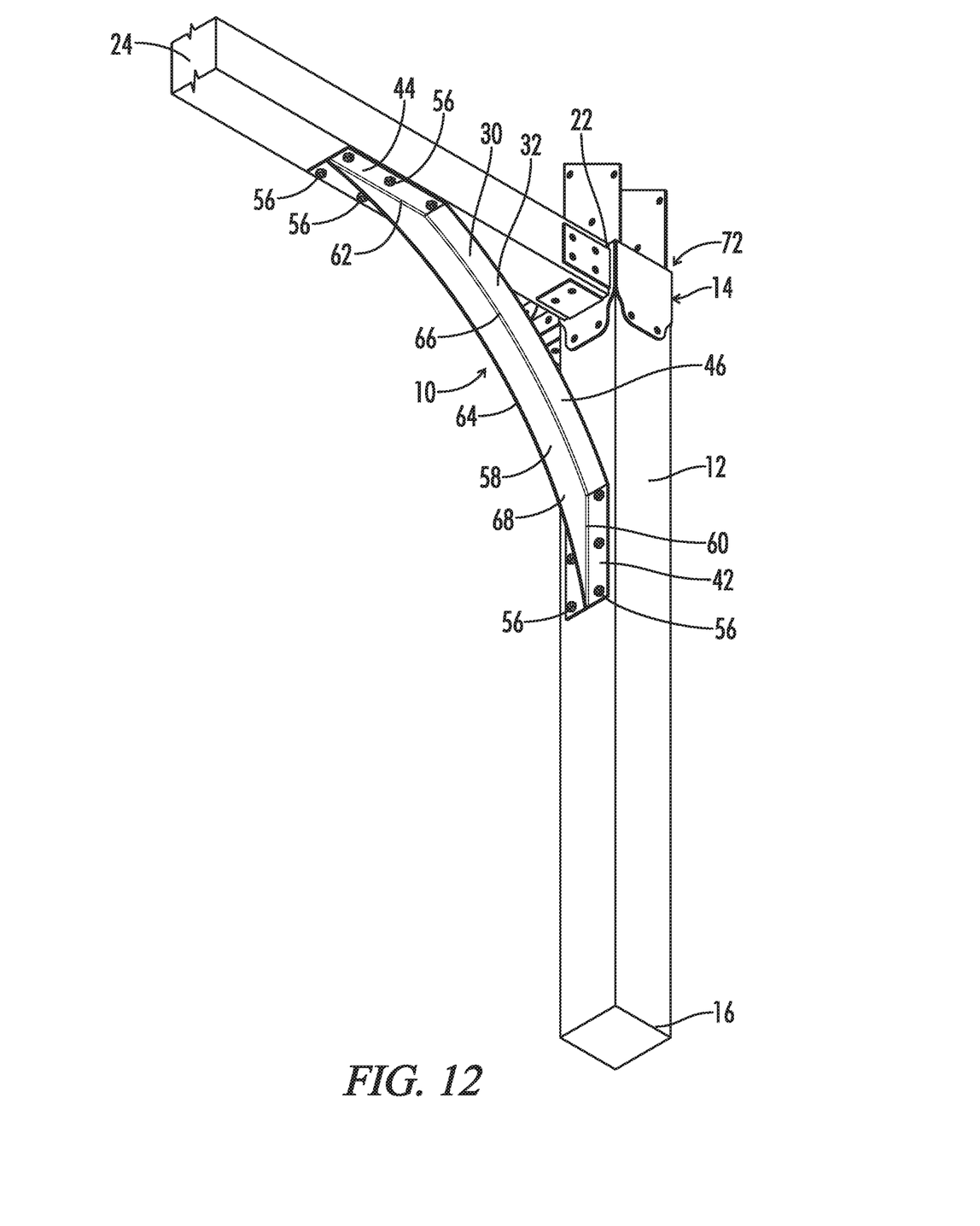
FIG. 12 illustrates a bottom perspective view of the curved brace of FIG. 1A with the curved brace connecting a support post to a lateral beam of the building of FIG. 1A.

The method may also include providing a curved brace 10 comprising a base plate 30 comprising a base plate interior surface 32, a base plate exterior surface 34, a base plate thickness 36 extending from the base plate interior surface 32 to the base plate exterior surface 34, a base plate proximal end 38, a base plate distal end 40. The base plate 30 may include a base plate proximal segment 42 configured to confront the support post 12, a base plate distal segment 44 located distal to the proximal segment 42 and configured to confront the lateral beam 20, and a base plate middle segment 46 located between the proximal segment 42 and the distal segment 44. The base plate proximal segment 42 may include at least one (preferably a plurality of) proximal segment fastener aperture(s) 48 extending through the base plate thickness 36. The base plate distal segment 44 may also include at least one (preferably a plurality of) distal segment fastener aperture(s) 50 extending through the base plate thickness 36. The fastener apertures 48 and 50 are preferably round. Preferably, at least the exterior surface 34 of the middle segment 46 is curved (preferably arch-shaped) and comprises an apex 54, as best seen in FIG. 6. Preferably, the interior surface 32 of the middle segment 46 is also curved (e.g., arch-shaped) as shown in FIGS. 5 and 12 for example.

As shown in FIGS. 1A-1B and FIGS. 12 and 13, the method may also include positioning the curved brace 10 so that at least a portion of the exterior surface 34 of the middle segment 46 (e.g., the apex 54 of the exterior surface 34 of the middle segment 46) faces the apex angle 28 by placing the exterior surface 34 of the proximal segment 42 against the support post 12, placing at least one fastener 56 through the at least one proximal segment fastener aperture 48 and into the support post 12, and placing the exterior surface 34 of the distal segment 44 against the lateral beam 20 and placing at least one fastener 56 through the at least one distal segment fastener aperture 50 and into the lateral beam 20. As a result, as shown in FIGS. 1A-1B and FIGS. 12 and 13, the curved brace 10 thereby connects the lateral beam 20 and the support post 12 (optionally in addition to the bracket 72). Optionally, as previously mentioned and shown in FIGS. 1A-1B and FIGS. 12 and 13, a bracket 72 also connects the top end of the support post 12 to the proximal end of the lateral beam 22. Optionally the support post 12 and lateral beam 20 are comprised of wood. Optionally, as shown in FIGS. 1A-1B and FIGS. 12 and 13, the support post 12 and the exterior surface 34 of the proximal segment 42 (after attachment of the curved brace 10 to the support post 12) are angled approximately 90 degrees relative to the ground, and the lateral beam 20 and the exterior surface 34 of the distal segment 44 (after attachment of the curved brace 10 to the lateral beam 20) are positioned approximately parallel to the ground. Optionally, the curved brace 10 is comprised of metal or other malleable material.

Figures 7, 8, 9, 10:
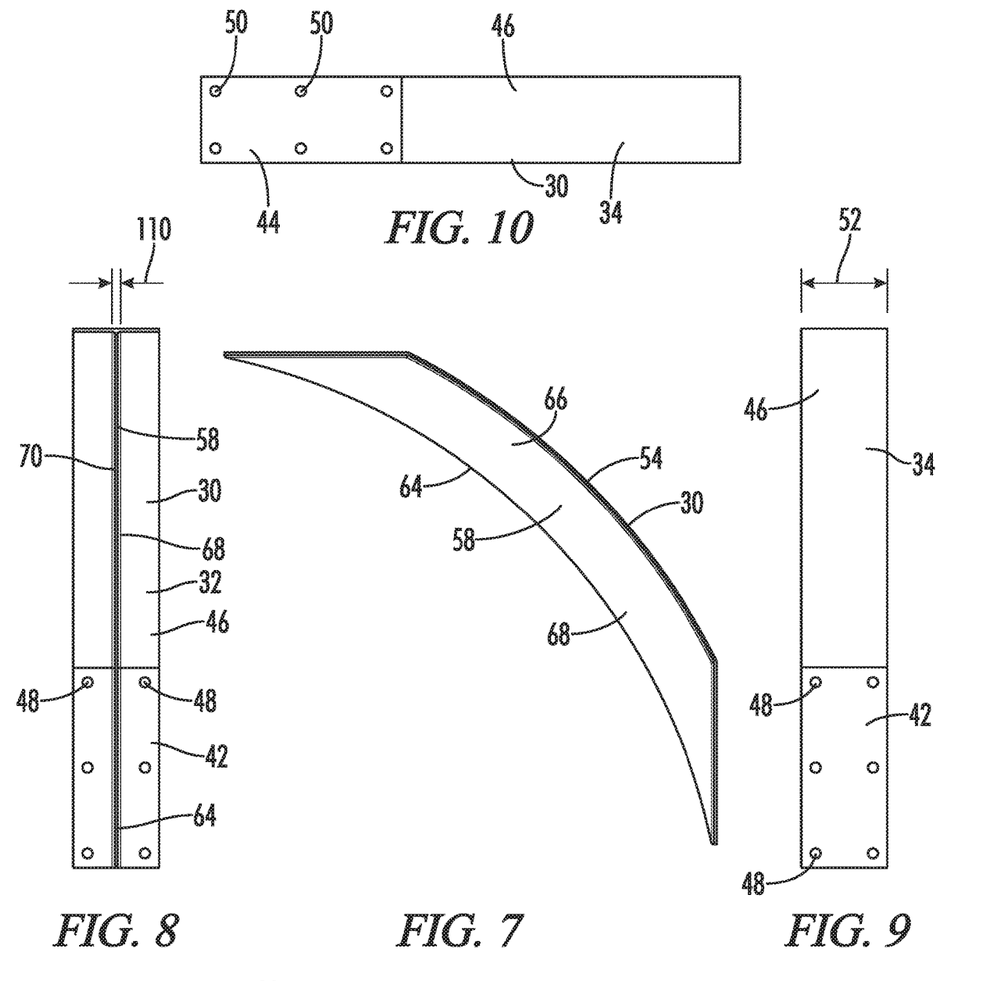
FIG. 7 illustrates a front elevation view of the curved brace of FIG. 1A.
FIG. 8 illustrates a proximal elevation view of the curved brace of FIG. 1A.
FIG. 9 illustrates a proximal elevation view of the curved brace of FIG. 1A; as compared to FIG. 8, the curved brace has been inverted so that the support plate is no longer visible.
FIG. 10 illustrates a distal elevation view of the curved brace of FIG. 1A.

Optionally, as best seen in FIGS. 5-13, the base plate proximal segment 42 and the base plate distal segment 44 are generally straight. Optionally, as best seen in FIGS. 5-13, the base plate proximal segment 42 and the base plate distal segment 44 are approximately the same length. Optionally, as best seen in FIGS. 5-13, the base plate middle segment 46 is at least as long as the combined lengths of the base plate proximal and distal segments 42 and 44. Optionally, as best seen in FIGS. 5, 6 and 8-11, the base plate 30 has approximately the same width from the base plate proximal segment 42 to the base plate distal segment 44. Optionally, as shown in FIGS. 9-10, the exterior surface 34 of the base proximal segment 42 and the exterior surface 34 of the base plate distal segment 44 are generally flat. Optionally, the base plate middle segment 46 is generally in the shape of an arch, as shown in FIGS. 5-6 for example. Optionally, the base plate middle segment 46 curves along a substantially constant radius, as shown in FIGS. 5-6 for example.

Figure 11:
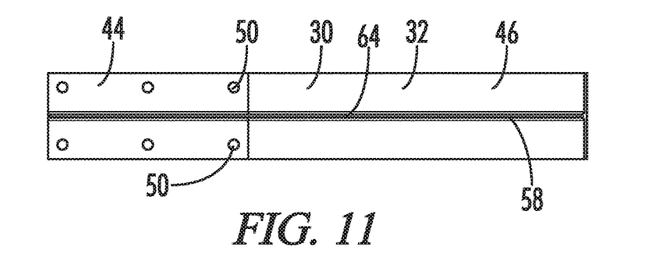
FIG. 11 illustrates a distal elevation view of the curved brace of FIG. 1A; as compared to FIG. 10, the curved brace has been inverted so that the support plate is visible.
Figure 13:
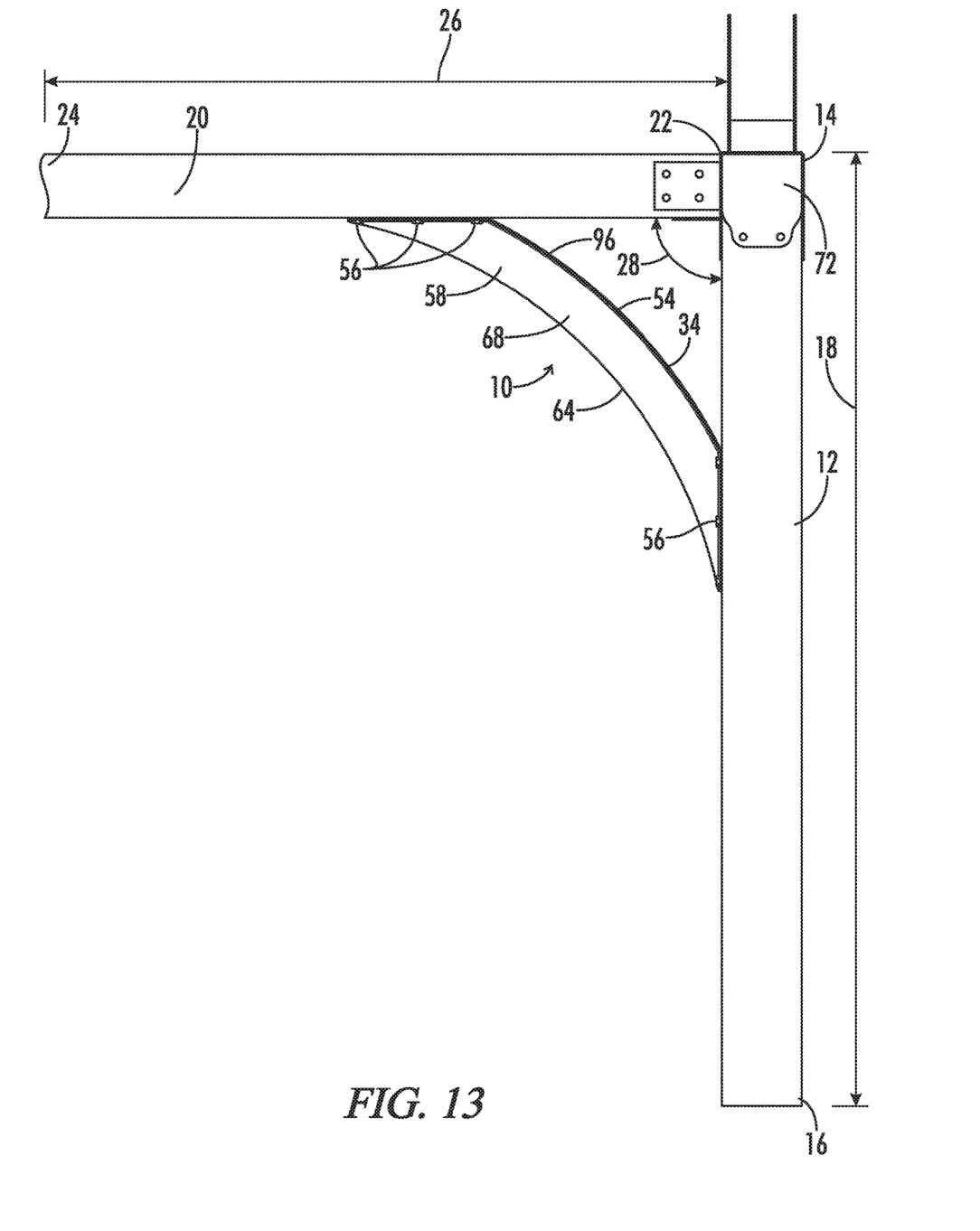
FIG. 13 illustrates a front elevation view of the curved brace, support post, and lateral beam of FIG. 12.

In some embodiments, as shown in FIGS. 1A, 1B, and 4A-13, the curved brace 10 further comprises a support plate 58 oriented generally perpendicular to, and extending from, the interior surfaces 34 of the proximal segment 42, the middle segment 46 and the distal segment 44. Optionally, the support plate 58 comprises a support plate base 66 attached to the base plate proximal, middle and distal segments 42, 46 and 44, and a free edge 64 opposite the support plate base 66 and extending from the support plate proximal end 60 to the support plate distal end 62. Optionally, the free edge 64 is also generally in the shape of an arch, as shown in FIGS. 5 and 7 and 13. Optionally, as shown in FIGS. 1A, 1B, 5, 7, 12 and 13 for example, the support plate 58 further comprises a generally flat front surface 68 and a generally flat rear surface 70. Optionally, as best seen in FIG. 5, the base plate proximal segment 42 comprises a plurality of proximal segment fastener apertures 48 extending through the base plate thickness 36, the base plate distal segment 44 comprises a plurality of distal segment apertures 50 and the support plate 58 is located between and does not cover the proximal segment and distal segment fastener apertures 48, 50. Instead, the proximal segment and distal segment fastener apertures 48 and 50 are located in front of and to the rear of the support plate 58, as shown in FIGS. 5, 8 and 11 for example. Optionally, the support plate 58 and the base plate 30 are separate parts welded together—e.g., the support plate 58 may be welded to the interior surfaces 32 of the base plate proximal segment, middle segment and distal segment 42, 46 and 44.

Preferably, the base plate proximal segment 42, middle segment 46 and distal segment 44 are part of a single plate, particularly, if the curved brace 10 is prepared according to the method described immediately below. However, in other embodiments where such method is not used, the base plate proximal segment 42, middle segment 46 and distal segment 44 may be three discrete plates welded together, for example.

Figure 1A:
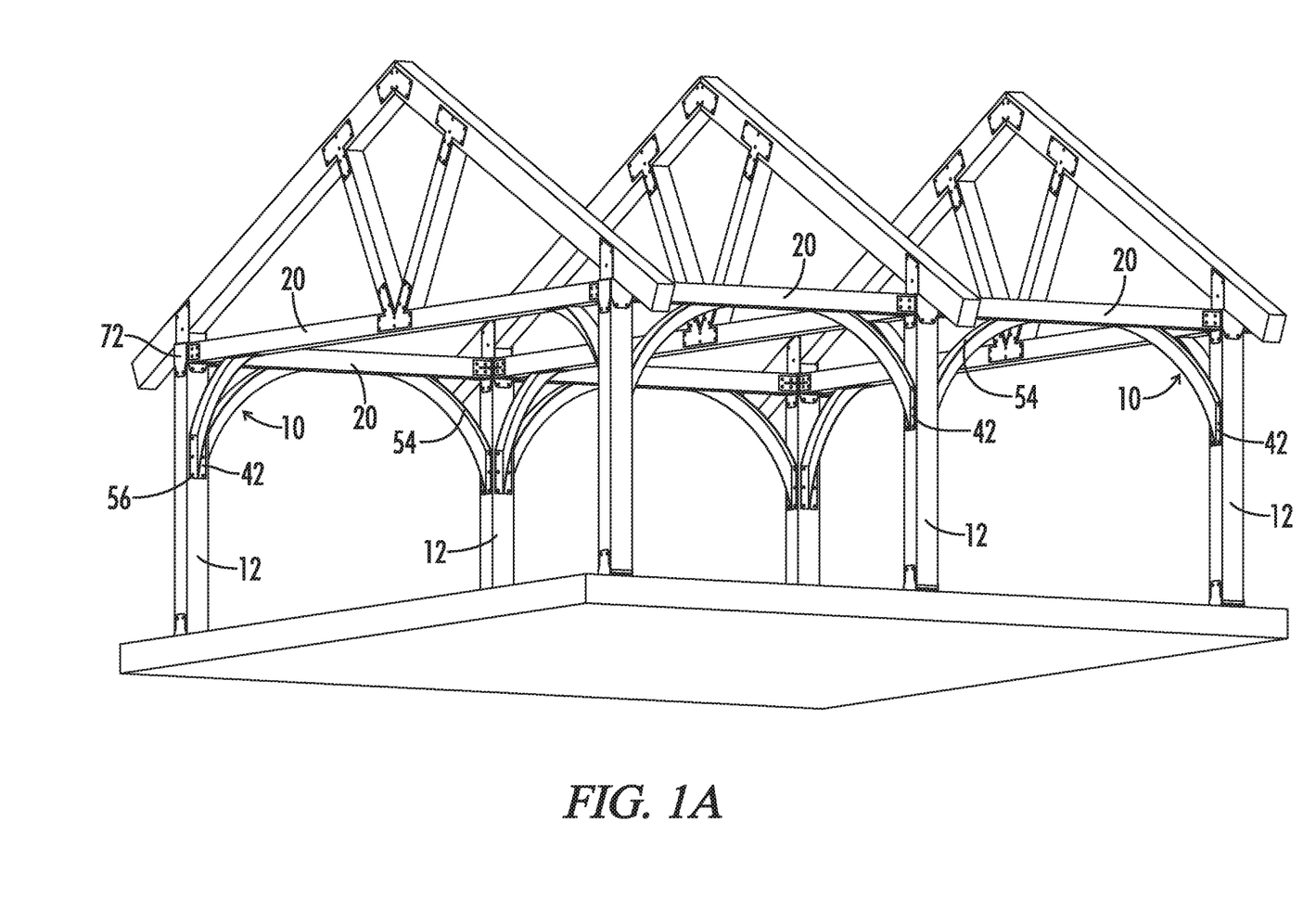
FIG. 1A illustrates a side perspective view of a building using a curved brace of one embodiment of the present invention.
Figure 1B:
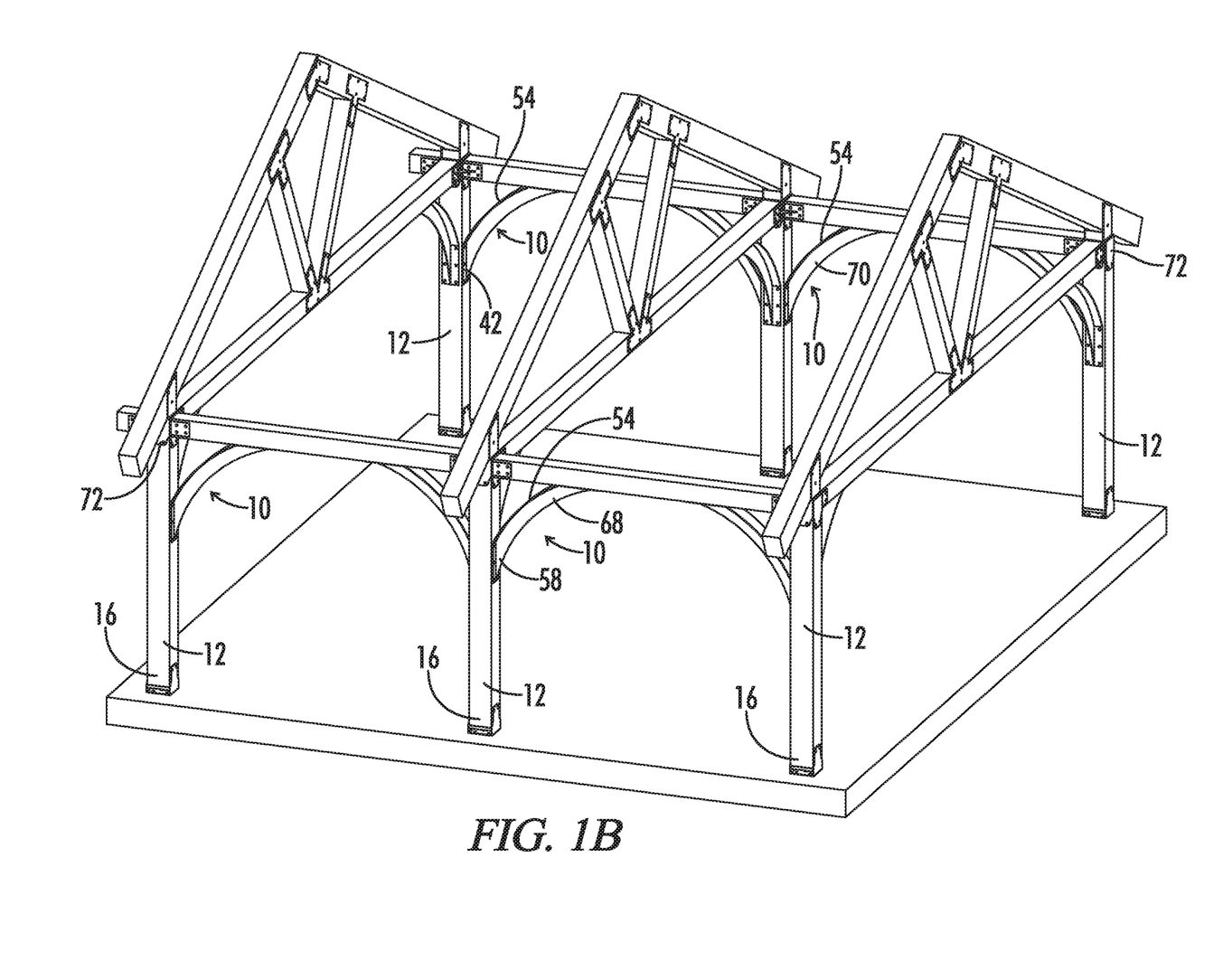
FIG. 1B illustrates another side perspective view of the building of FIG. 1A.
Figure 2A:
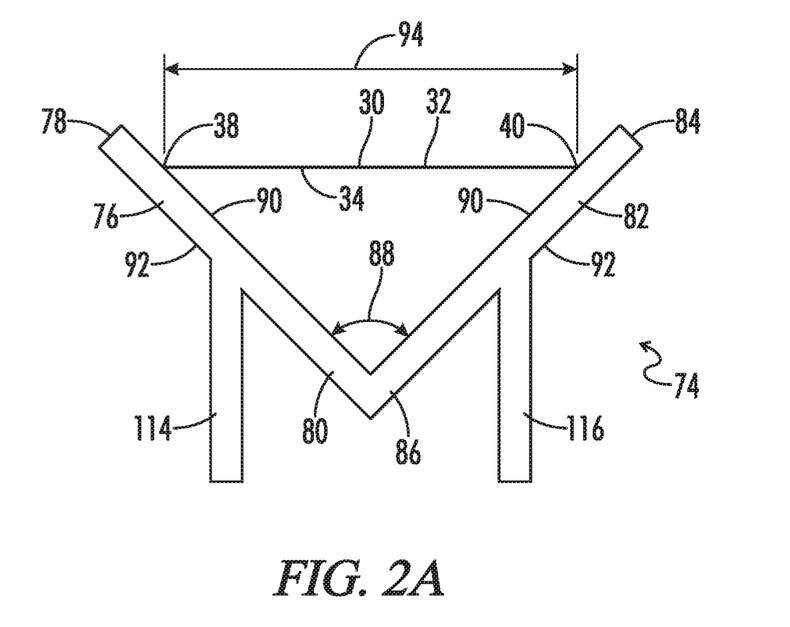
FIG. 2A illustrates a front elevation view of a jig and base plate used to prepare the curved brace of FIG. 1A prior to welding a base of a support plate to the base plate.
Figure 2B:
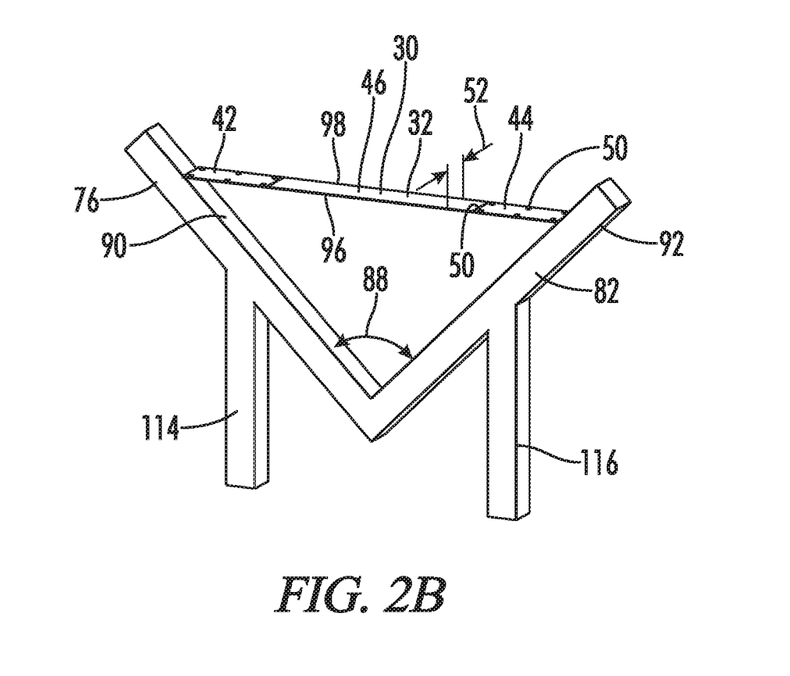
FIG. 2B illustrates a front perspective view of the jig and base plate of FIG. 2A.
Figure 3A:
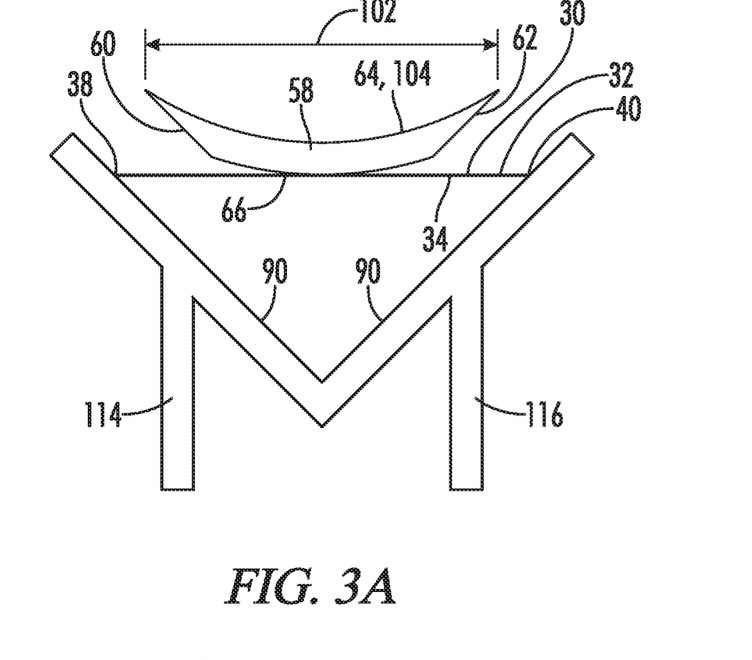
FIG. 3A illustrates a front elevation view of the jig and base plate of FIG. 2A after welding a base of a support plate to the base plate.
Figure 3B:
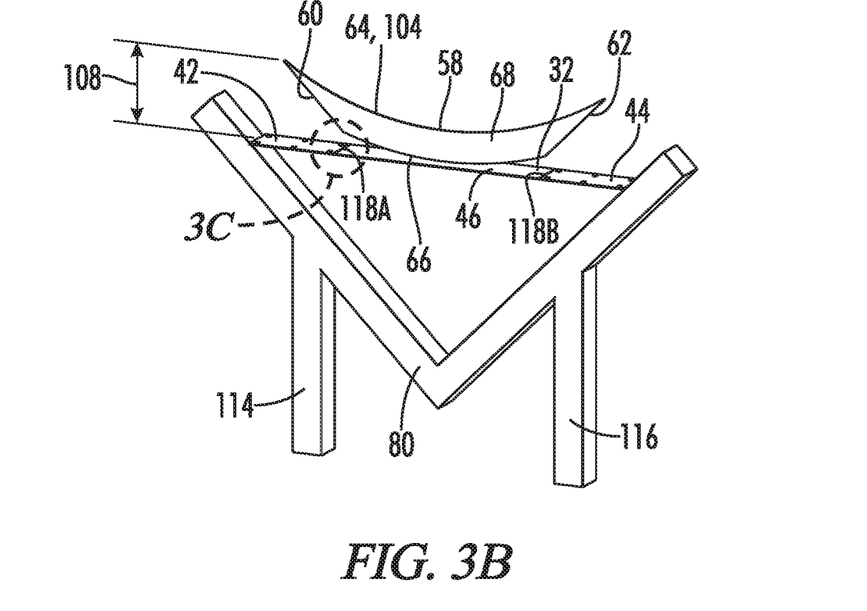
FIG. 3B illustrates a front perspective view of the jig and base plate of FIG. 3A.
Figure 4A:
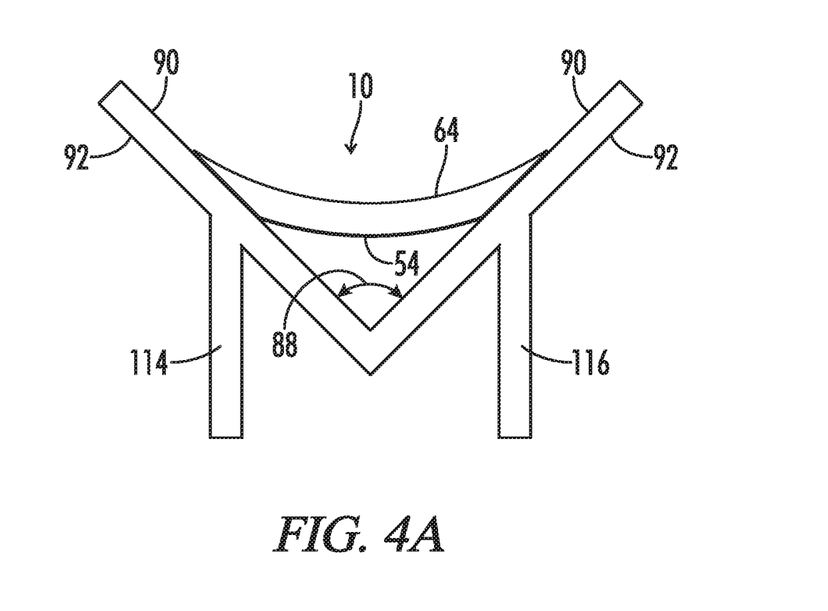
FIG. 4A illustrates a front elevation view of the jig and base plate of FIG. 3A after moving the base plate proximal, middle and distal segments downwardly and welding the support plate proximal end and the support plate distal end to the base plate interior surface.
Figure 4B:
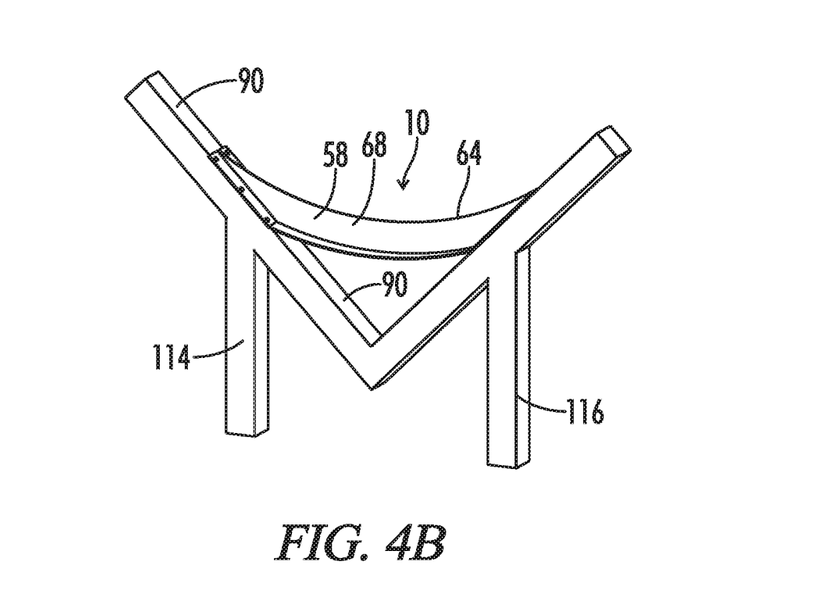
FIG. 4B illustrates a front perspective view of the jig and base plate of FIG. 4A.

The curved brace 10 may be assembled by any suitable method. In some embodiments, as best seen in FIGS. 2A-4B, the present disclosure provides a method of manufacturing a curved brace 10 comprising the steps of: a) providing a jig 74 comprising a proximal arm 76 comprising a top 78 and a bottom 80, a distal arm 82 comprising a top 84 and a bottom 86, the proximal arm 76 and the distal arm 82 sloping towards one another, the proximal arm 76 and the distal arm 82 sloping towards each from the tops to the bottoms of the respective arms 76, 82, the proximal arm 76 forming an apex angle 88 (e.g., at least 30 degrees, preferably at least 60 degrees, e.g., approximately 90 degrees) with the distal arm 82, each arm 76, 82 comprising an interior surface 90 facing the other arm 76, 82 and an exterior surface 92 opposite the interior surface 90. More particularly, the interior surfaces 90 of the proximal and distal arms 76 and 82 form the apex angle 88. Although in FIGS. 2A-4B, the bottom of the proximal and distal arms 80, 86 are directly attached, the bottom of the proximal and distal arms 80, 86 need not be directly attached. Thus, the word "apex angle" is not intended to require a direct or indirect attachment between the proximal and distal arms 76, 82. Preferably, at least the interior surfaces 90 of the proximal and distal arms 76 and 82 (and preferably the entire proximal and distal arms 76 and 82) are generally straight and flat to provide a straight edge for assembly of the curved brace 10. Optionally, as shown in FIGS. 2A-2B, the method further includes b) providing a base plate 30 comprising a proximal end 38, a distal end 40, a length 94 extending from the proximal end 38 to the distal end 40, an interior surface 32, a base plate exterior surface 34 located below the interior surface 32, a thickness 36 extending from the interior surface 32 to the exterior surface 34 and generally perpendicular to the length 94, a front 96, a rear 98, and a width 100 extending from the front 96 to the rear 98 and generally perpendicular to the thickness 36 and the length 94. Optionally, as best seen in FIG. 2B, the base plate 30 comprises a proximal segment 42 (optionally comprising one or more fastener apertures 48), a middle segment 46 distal to the proximal segment 42, and a distal segment 44 (optionally comprising one or more fastener apertures 50) distal to the middle segment 46. Optionally, as shown in FIGS. 3A and 3B, the method further includes c) providing a support plate 58 comprising a proximal end 60, a distal end 62, a length 102 extending from the proximal end 60 to the distal end 62, a base 66, a top 104, a height 108 extending from the base 66 to the top 104 and generally perpendicular to the length 102, a front surface 68, a rear surface 70, and a width 110 extending from the front surface 68 to the rear surface 70 and generally perpendicular to the height 108 and the length 102. Optionally, as shown in FIGS. 3A and 3B, the proximal end 60 and the distal end 62 slope towards each other from the top 104 to the base 66 of the support plate 58. Optionally, at least a portion of the support plate base 66 is curved (e.g., optionally, the entire base 66 is arch-shaped like a boat as shown in FIGS. 3A and 3B). Optionally, as shown in FIGS. 3A and 3B, the method further includes d) positioning the base plate 30 in the jig 74 so that the proximal end of the base plate 38 confronts the interior surface 90 of the proximal arm 76 and the distal end of the base plate 40 confronts the interior surface 90 of the distal arm 82. Optionally, as shown in FIGS. 3A and 3B, the method further includes e) before or after step d), positioning the support plate 58 on the base plate interior surface 32 so that the support plate 58 is oriented generally perpendicular to the support plate 58. Optionally, as shown in FIGS. 4A and 4B, the method further includes the step of f) moving the middle segment of the base plate 46 and the support plate 58 downwardly towards the apex angle 88 so that the exterior surface 34 of the proximal segment 42 of the base plate 30 confronts the interior surface 90 of the proximal arm 76 and so that the exterior surface 34 of the distal segment 44 of the base plate 30 confronts the interior surface 90 of the distal arm 82. Optionally, step f) is after steps a)-e). Optionally, the method further includes g) securing (e.g., welding) the base of the support plate 66, the proximal end of the support plate 60, and the distal end of the support plate 62 to the base plate interior surface 32. Optionally, step g) is after step f). The proximal and distal ends of the support plate 60, 62 are preferably free edges prior to step g).

Optionally, apex angle 28 formed by the support post 12 and the lateral beam 20 is substantially equal to the apex angle 88 formed by the proximal and distal arms 76, 82 (e.g., both apex angles 28, 88 are 90 degrees as shown in the illustrations).

Optionally, as best seen in FIGS. 3A and 3B, before step f), the proximal end and the distal end of the support plate 60, 62 slope towards each other from the top 104 to the base of the support plate 66 at the same substantially constant angle. Optionally, as best seen in FIGS. 2A-3B, before step f), the base plate 30 is generally straight and flat. Optionally, as best seen in FIGS. 3A and 3B, in step e), the proximal end of the support plate 60 is generally parallel to the proximal arm 76 and the distal end of the support plate 62 is generally parallel to the distal arm 82. Optionally, as shown in FIGS. 2A-4B, the jig further comprises a proximal leg 114 connected to the proximal arm 76 and extending downwardly from the proximal arm 76 and a distal leg 116 connected to the distal arm 82 and extending downwardly from the distal arm 82. Optionally, the base plate 30 is comprised of a malleable material (e.g., metal) and has a thickness of from about 0.125 to about 0.375 inches. Optionally, as best seen in FIGS. 2B and 3B, in step b), the base plate 30 is generally rectangular in shape. Optionally, during step f), a portion of the base plate proximal segment 42 and a portion of the base plate distal segment 44 move downwardly but the proximal and distal ends of the base plate 38, 40 do not move downwardly. Optionally, the base plate 30 and support plate 58 are made of the same material (to aid in welding). In some embodiments, the base plate 30 and support plate 58 are made from hot rolled mild steel plate.

Figure 3C:
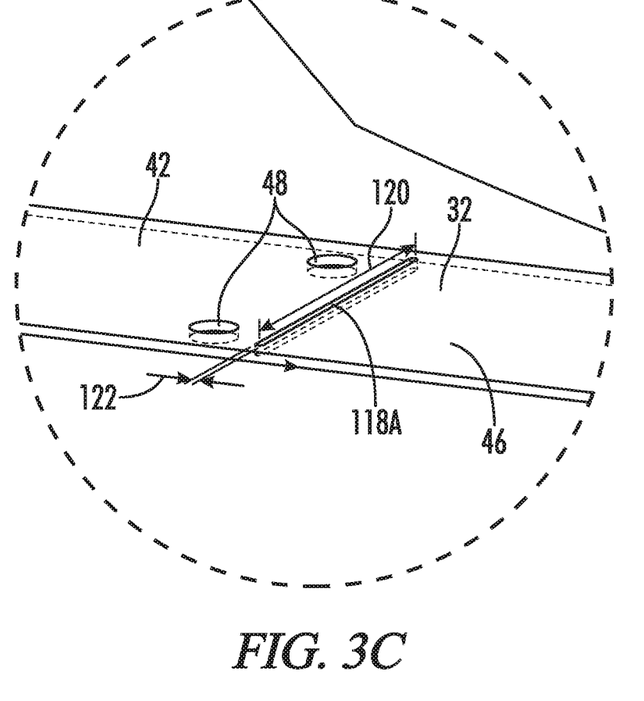
FIG. 3C illustrates a front perspective view of the area of the base plate labelled 3C in FIG. 3B.

Optionally, the base plate 30 interior surface 32 comprises two relief slits 118A, 118B to facilitate bending. More particularly, as best seen in FIG. 3B and the close-up view shown in FIG. 3C, prior to step e) (e.g., in step b), the base plate 30 may comprise a proximal slit 118A and a distal slit 118B located distal to the proximal slit 118A that extend at least partially through thickness 36 of the base plate. Preferably, the proximal and distal slits 118A, 118B (which may be generally rectangular in shape) extend substantially through the thickness 36 of the base plate 30 (i.e., all the way through or almost all the way through the thickness 36 from the base plate interior surface 32 to the base plate exterior surface 34). Preferably, the proximal and distal slits 118A, 118B do not extend across the entire width 52 of the base plate 30. Preferably, the proximal and distal slits 118A, 118B are generally parallel to the base plate width 52. Preferably, the proximal slit 118A is located at the intersection of the proximal segment 42 and the middle segment 46 and the distal slit 118B is located at the intersection of the distal segment 44 and the middle segment 46. Preferably, the proximal segment 42 comprises at least one proximal segment fastener aperture 48 extending through the base plate thickness 36 and located proximal to the proximal slit 118A and the distal segment may comprise at least one distal segment fastener aperture 50 extending through the base plate thickness 36 and located distal to the distal slit 118B. As shown in FIG. 3C, for each slit 118A, 118B, the length 120 of the slit (as measured from the front to the rear of the slit—i.e., parallel to the base plate width 36) is preferably larger than the slit width 122 (as measured from the proximal end to the distal end of the slit). Optionally, the proximal and distal slits 118A, 118B are filled with weld during the welding process.

| Part List | |
|---|---|
| curved brace | 10 |
| support post | 12 |
| support post top end | 14 |
| support post bottom end | 16 |
| support post height | 18 |
| lateral beam | 20 |
| lateral beam proximal end | 22 |
| lateral beam distal end | 24 |

-continued

Part List

| | |
|---|---|
| lateral beam length | 26 |
| apex angle formed by support post and lateral beam | 28 |
| base plate | 30 |
| base plate interior surface | 32 |
| base plate exterior surface | 34 |
| base plate thickness | 36 |
| base plate proximal end | 38 |
| base plate distal end | 40 |
| base plate proximal segment | 42 |
| base plate distal segment | 44 |
| base plate middle segment | 46 |
| base plate proximal segment fastener aperture | 48 |
| base plate distal segment fastener aperture | 50 |
| base plate width | 52 |
| base plate middle segment exterior surface apex | 54 |
| Fastener | 56 |
| support plate | 58 |
| support plate proximal end | 60 |
| support plate distal end | 62 |
| support plate free edge | 64 |
| support plate base | 66 |
| support plate front surface | 68 |
| support plate rear surface | 70 |
| bracket | 72 |
| jig | 74 |
| jig proximal arm | 76 |
| jig proximal arm top/proximal end | 78 |
| jig proximal arm bottom | 80 |
| jig distal arm | 82 |
| jig distal arm top/distal end | 84 |
| jig distal arm bottom | 86 |
| arm apex angle | 88 |
| arm interior surface | 90 |
| arm exterior surface | 92 |
| base plate length | 94 |
| base plate front | 96 |
| base plate rear | 98 |
| support plate length | 102 |
| support plate top | 104 |
| support plate height | 108 |
| support plate width | 110 |
| jig proximal leg | 114 |
| jig distal leg | 116 |
| base plate proximal and distal slits | 118A, 118B |
| Slit length | 120 |
| Slit width | 122 |

Having now described the invention in accordance with the requirements of the patent statutes, those skilled in the art will understand how to make changes and modifications to the disclosed embodiments to meet their specific requirements or conditions. Changes and modifications may be made without departing from the scope and spirit of the invention. In addition, the steps of any method described herein may be performed in any suitable order and steps may be performed simultaneously if needed.

Terms of degree such as "generally", "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

What is claimed is:

1. A method of manufacturing a curved brace comprising the steps of
    a) providing a jig comprising a proximal arm comprising a top and a bottom, a distal arm comprising a top and a bottom, the proximal arm and the distal arm sloping towards one another from the tops to the bottoms of the respective arms, the proximal arm forming an apex angle with the distal arm, each arm comprising an interior surface facing the other arm and an exterior surface opposite the interior surface;
    b) providing a base plate comprising a proximal end, a distal end, a length extending from the proximal end to the distal end, a base plate interior surface, a base plate exterior surface located below the base plate interior surface, a thickness extending from the base plate interior surface to the base plate exterior surface and generally perpendicular to the length, a front, a rear, and a width extending from the front to the rear and generally perpendicular to the thickness and the length, the base plate comprising a proximal segment, a middle segment distal to the proximal segment, and a distal segment distal to the middle segment;
    c) providing a support plate comprising a proximal end, a distal end, a length extending from the proximal end to the distal end, a base, a top, a height extending from the base to the top and generally perpendicular to the length, a front surface, a rear surface, and a width extending from the front surface to the rear surface and generally perpendicular to the height and the length, wherein the proximal end and the distal end slope towards each other from the top to the base of the support plate, and further wherein at least a portion of the support plate base is curved;
    d) positioning the base plate in the jig so that the proximal end of the base plate confronts the interior surface of the proximal arm and the distal end of the base plate confronts the interior surface of the distal arm;
    e) before or after step d), positioning the support plate on the base plate interior surface so that the base plate is oriented generally perpendicular to the support plate;
    f) after steps a)-e), moving the middle segment of the base plate and the support plate downwardly towards the apex angle so that the exterior surface of the proximal segment of the base plate confronts the interior surface of the proximal arm and so that the exterior surface of the distal segment of the base plate confronts the interior surface of the distal arm; and
    g) securing the base of the support plate, the proximal end of the support plate, and the distal end of the support plate to the base plate interior surface.

2. The method of claim 1, wherein, before step f), the proximal end and the distal end of the support plate slope towards each other from the top to the base of the support plate at the same substantially constant angle.

3. The method of claim 1, wherein, before step f), the base plate is generally straight and flat.

4. The method of claim 1 wherein, in step e), the proximal end of the support plate is generally parallel to the proximal arm and the distal end of the support plate is generally parallel to the distal arm.

5. The method of claim 1, wherein the jig further comprises a proximal leg connected to the proximal arm and extending downwardly from the proximal arm and a distal leg connected to the distal arm and extending downwardly from the distal arm.

6. The method of claim 1 wherein the base plate is comprised of a malleable material and has a thickness of from about 0.125 inches to about 0.375 inches.

7. The method of claim 1 wherein in step b), the base plate is generally rectangular in shape.

8. The method of claim 1 wherein during step f), a portion of the base plate proximal segment and a portion of the base plate distal segment move downwardly but the proximal and distal ends of the base plate do not move downwardly.

9. The method of claim 1 wherein, in step d), the base plate comprises a proximal slit and a distal slit located distal to the proximal slit, and further wherein the proximal and distal slits extend at least partially through the thickness of the base plate.

10. The method of claim 9 wherein the proximal and distal slits extend substantially through the thickness of the base plate.

11. The method of claim 10 wherein the proximal and distal slits extend through the thickness of the base plate.

12. The method of claim 10 wherein the proximal and distal slits do not extend across the entire width of the base plate.

13. The method of claim 9 wherein the proximal and distal slits are generally parallel to the base plate width.

14. The method of claim 9 wherein the proximal slit is located at the intersection of the base plate proximal segment and the base plate middle segment and the distal slit is located at the intersection of the base plate distal segment and the base plate middle segment.

15. The method of claim 14 wherein the proximal segment comprises at least one proximal segment fastener aperture extending through the base plate thickness and located proximal to the proximal slit and further wherein the distal segment comprises at least one distal segment fastener aperture extending through the base plate thickness and located distal to the distal slit.

16. The method of claim 15 wherein the at least one proximal segment fastener aperture and the at least one distal segment fastener aperture are round and the proximal and distal slits are generally rectangular in shape.

17. The method of claim 1 wherein the base plate and support plate are metal and step g) comprises welding the base of the support plate, the proximal end of the support plate, and the distal end of the support plate to the base plate interior surface.

18. The method of claim 1, wherein, in step d) the base plate has a thickness of from about 0.125 inches to about 0.375 inches.

19. The method of claim 1 wherein, in step f), the apex angle of the jig is approximately 90 degrees.

* * * * *